United States Patent Office 3,444,216
Patented May 13, 1969

3,444,216
PROCESS FOR THE OXIDATION OF PRIMARY
AND SECONDARY ALCOHOLS
Jekishan R. Parikh, Kalamazoo, Mich., and William
Von E. Doering, Hamden, Conn., assignors to The
Upjohn Company, Kalamazoo, Mich., a corporation of
Delaware
No Drawing. Filed Nov. 16, 1966, Ser. No. 594,700
Int. Cl. C07c 167/00, 45/16, 169/34
U.S. Cl. 260—397.45                                27 Claims This invention relates to a novel process for the oxidation of primary and secondary alcohols. More particularly, this invention relates to a general process for the oxidation of primary alcohols to obtain the corresponding aldehydes and the oxidation of secondary alcohols to obtain the corresponding ketones. The process of this invention is especially useful as a general process for the oxidation, under comparatively mild conditions, of primary and secondary hydroxy functions in steroids and is particularly advantageous for the oxidation of allylic alcohols and for the selective oxidation of hydroxy groups in steroids containing an additional 11β-hydroxyl group, which being sterically hindered, is relatively inert to oxidation by this novel process.

The process of this invention comprises reacting a primary or secondary alcohol with a hydrocarbonsulfoxide and sulfur trioxide in the presence of a tertiaryamine to obtain the corresponding aldehyde or the corresponding ketone, respectively. The oxidation is preferably carried out under substantially anhydrous conditions. The term sulfur trioxide as used herein is inclusive of sulfur trioxide per se and sulfur trioxide complexes as hereinafter defined.

Oxidation of primary and secondary alcohols is well known in the art and can be carried out using numerous reagents, for example, chromic-acid, Oppenauer, potassium permanganate, N-bromoacetamide and like oxidation methods. These methods, however, often impose severe limitations because of undesirable side reactions. A general method for the oxidation of alcohols, under comparatively mild conditions, is described by Pfitzner et al. J.A.C.S., 85, 3027–8 (1963); Pfitzner et al. J.A.C.S. 87, 5661–5677 (1963); Fenselau et al. J.A.C.S. 88, 1762–1765 (1966) and Moffatt et al. U.S. Patent 3,248,380, employing hydrocarbon sulfoxides and N,N'-di(hydrocarbon substituted) carbodiimides in the presence of an acid catalyst. This method possesses a number of serious disadvantages: (1) carbodiimides are extremely toxic and their use is attended with potential health hazards. (2) carbodiimides are relatively expensive, (3) oxidations carried out using carbodiimides and dimethylsulfoxide require comparatively longer reaction periods than the process of the present invention, (4) oxidations carried out with carbodiimides have been found to be less selective than the process of the present invention, particularly in the oxidation of allylic alcohols, giving rise to undesirable side reaction products, and (5) oxidations carried out in the presence of carbodiimides result in formation of the corresponding ureas. The presence of these ureas in the reaction mixture makes isolation and purification of the desired oxidation products difficult. Elaborate time consuming and costly purification procedures such as chromotography are generally required.

In contrast oxidations carried out using the process of the present invention employ less hazardous and less expensive reagents and give products which are much more easily recovered from the reaction mixture and which can be purified by simple and conventional methods such as recrystallization from a suitable solvent, etc. Oxidations carried out using the process of the present invention are extremely fast and thus less time consuming, an important factor in industrial production.

The process of this invention is useful for the oxidation of any primary alcohol of the formula: R—CH$_2$OH to obtain the corresponding aldehyde of the formula: R=CHO or any secondary alcohol of the formula

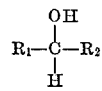

to obtain the corresponding ketone of the formula:

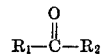

where in the above formulae R represents hydrogen or an aliphatic, alicyclic, aromatic or heterocyclic group; $R_1$ and $R_2$ taken separately each represent an aliphatic, alicyclic, aromatic or heterocyclic group; and $R_1$ and $R_2$ when taken together and connected represent an alicyclic or heterocyclic secondary alcohol wherein the hydroxy group is attached to a ring carbon atom.

Included among the aliphatic, alicyclic and aromatic groups which R, $R_1$ and $R_2$ can each represent when taken separately are, for example, alkyl (including saturated and unsaturated, straight and branched chain alkyl and cycloalkyl) and aryl (including alkaryl and aralkyl) radicals, such as methyl, ethyl, propyl, isopropyl, n-butyl, sec. butyl, tert. butyl, amyl, hexyl, heptyl, octyl, vinyl, alkyl, methallyl, butenyl, pentenyl, heptenyl, octenyl, ethynyl, propynyl, butynyl, pentynyl, hexynyl, heptynyl, octynyl and isomeric forms thereof, cyclobutyl, cyclopentyl, cyclohexyl, methylcyclohexyl, cycloheptyl, cyclooctyl, cyclodecyl, cycloundecyl, cyclododecyl, cyclopentadecyl, phenyl, tolyl, xylyl, benzyl and the like, as well as fused and bridged ring structures, such as indanyl, indenyl, naphthyl, acenaphthyl, phenanthryl, cyclopentanopolylhydrophenanthryl, adamantanyl, bicyclo[3:1:1]heptyl, bicyclo[2:2:2]octyl and the like; all of which can either be unsubstituted or substituted with one or more noninterfering substituents, such as tertiary hydroxy groups; hydroxyl derivatives, for example, alkoxy such as methoxy, ethoxy, propoxy, butoxy and the like; acyloxy, such as acetoxy, propionoxy, butoxy and the like; nitro groups; amino groups; alkylamino groups, such as methylamino, ethylamino, dimethylamino and the like; halogens, such as fluorine, chlorine or bromine; carbonyl; carbonyl derivatives such as enol ethers and ketals; and the like; and which can also be substituted by other primary and secondary hydroxyl groups which can likewise be oxidized by the process of this invention, such as, for example, those occurring in such substances as glycols, sugars, nucleosides, nucleotides, antibiotics and the like. When the oxidation of certain hydroxyl groups is not desired, these can be protected by methods well known in the art, for example, by the preparation of hydroxyl derivatives such as esters, ethers, acetals and the like.

Included among the heterocyclic groups which R, $R_1$ and $R_2$ can represent are substituted and unsubstituted azabicycloalkane groups such as azabicyclo [3.2.2] octyl and azabicyclo [3.2.2] nonyl and the like, furfuryl groups, tetrahydrofurfuryl groups, piperidyl groups, pyrrolidyl groups, pyridyl groups, thiophene groups, alkaloid nuclei groupings containing for example indole, dihydroindole, quinclidine, quinthio groups and the like.

Included among the alicyclic and heterocyclic alcohols in which $R_1$ and $R_2$ when taken together and connected can represent, are cyclopropanols, cyclobutanols, cyclohexanols, dicyclohexanols, cyclodecanols, cyclododecanols, cyclopentadecanols and the like; piperidols, pyrrolidols and the like; fused ring systems such as cyclopentanopolyhydrophenanthranols, indanols, indenols, and the like; bridged ring systems such as adamantanols, bicyclo [2.2.1] heptanols, bicyclo [2.2.2] octanols, bicyclo [3.2.2] nonanols, azabicycloalkanols and the like, all of which can be substituted by non-interfering substituents such as those hereinbefore named and which can also be substituted by other primary and secondary hydroxy groups which can likewise be oxidized by the process of the present invention.

The process of this invention is especially useful for the oxidation of allylic alcohols and for the oxidation of primary and secondary hydroxyl groups in steroids. Primary and secondary allylic alcohols are oxidized by the process of this invention without the formation of appreciable amounts of undesirable by-products to obtain the corresponding $\alpha,\beta$-unsaturated aldehydes and ketones, respectively. Hydroxy groups in streoids such as those present at such positions 3, 6, 16, 17, 20, 21 and the like and 11$\alpha$-hydroxy groups are easily oxidized to the corresponding aldehyde and keto groups using the process of this invention.

The process of this invention is particularly advantageous for the selective oxidation of primary and secondary hydroxy groups in steroids which also have a sterically hindered 11$\beta$-hydroxy group present. For example, the oxidation of 20$\alpha$ and 20$\beta$ hydroxy groups of steroids, wherein an 11$\beta$-hydroxy group is also present, these 20-hydroxy steroids as well as the other steroids mentioned hereinabove can also have other substituents, such as ketone, hydroxy, acyloxy, carboalkoxy, halogen, alkyl, alkylene and the like attached at one or more of the other carbon atoms of the steroid nucleus, such as 2, 4, 6, 7, 12, 16, 17 and other positions, and in addition the steroid nucleus can contain double bonds which can be either isolated or conjugated such as 4(5), 1(2), 9(11), 17(20), 16(17) and the like. Other primary and secondary hydroxy groups present will of course be concomitantly oxidized to the corresponding aldehyde and keto groups.

The selective oxidation of 20-hydroxy steroids is illustratively represented by the following flow diagram of partial structural formulae:

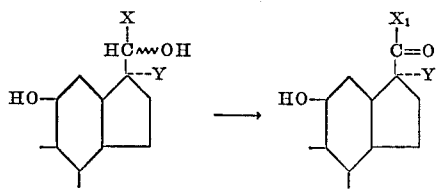

wherein X is methyl, hydroxymethyl or acyloxymethyl; $X_1$ is methyl, formyl or acyloxymethyl; Y is hydrogen or hydroxy and the wavy line ($\xi$) appearing at the 20-position indicates an alpha ($\alpha$) oriented hydroxy group, a beta ($\beta$) oriented hydroxy group or mixtures thereof. For example, 11$\beta$,17$\alpha$,20$\alpha$-21-tetrahydroxy-4-pregnen-3-one 21 acetate or mixtures thereof can be selectively oxidized to hydrocortisone acetate (11$\beta$,17$\alpha$,21-hydroxy-4-pregnen-3, 20-dione 21-acetate) by the process of this invention.

In carrying out the process of this invention, a hydrocarbon sulfoxide which is a liquid at the temperature at which the reaction is to be carried out i.e., dimethylsulfoxide, diethylsulfoxide, tetramethylenesulfoxide, ethylene episulfoxide and the like, can be used as the solvent for the alcohol to be oxidized or it can be mixed with one or more mutually compatible inert organic solvents, such as benzene, toluene, xylene, dioxan, tetrahydrofuran, ethyl acetate, methylene chloride, acetone, etc. The hydrocarbon sulfoxide is employed in molar excess. When an inert organic solvent or solvents are employed the amount of hydrocarbon sulfoxide present should be at least 10% and preferably at least 50% by volume of the entire solvent mixture. The total amount of solvent employed is dependent on the solubility of the particular alcohol which is to be oxidized. Solutions containing from about 1% to about 30% by weight of alcohol are especially advantageous, although lesser or greater amounts can be employed if desired for a particular alcohol. The preferred solvent is dimethylsulfoxide alone or in admixture with an inert solvent or solvents.

Sulfur trioxide can be employed per se or preferably sulfur trioxide can be used in a complex form. Sulfur trioxide, being an electron acceptor or Lewis acid, combines with electron donors or Lewis bases or with organic compounds which act as Lewis bases, to form coordination compounds, also known as "adducts" or "complexes." The bases employed to form these complexes may be tertiary amines, including those which are fairly strong, e.g., trimethyl-or triethylamines, or considerably weaker bases, e.g., pyridine or dimethylaniline. Other even weaker bases can be used for example, tertiary amides, ethers and thioethers and the like. Examples of such complexes are pyridine-sulfur trioxide, trimethylamine-sulfur trioxide, dioxane-sulfur trioxide, triethylamine-sulfur trioxide, dimethylaniline-sulfur trioxide, thioxane-sulfur trioxide, bis(2-chloroethyl) ether-sulfur trioxide, 2-methylpyridine-sulfur trioxide, quinoline-sulfur trioxide, dimethylformamide-sulfur trioxide, dimethylsulfoxide-sulfur trioxide and the like. Sulfur trioxide per se is difficult to handle and store whereas sulfur trioxide complexes are amenable to convenient handling. Sulfur trioxide complexes are disclosed and can be prepared in accordance with Everett E. Gilbert, Chemical Reviews, vol. 62, pages 551-555 (1962). Sulfur trioxide or sulfur trioxide complexes are preferably used in molar excess and can be present within the range of from about 0.5 to about 10 molar equivalents of sulfur trioxide per molar equivalent of the alcohol being oxidized, although greater or lesser amounts are operative. In the process of this invention, the preferred range of sulfur trioxide or sulfur trioxide complex is about 1 to 5 molar equivalents of sulfur trioxide per molar equivalent of the alcohol being oxidized with about 3 molar equivalents per mole of alcohol being particularly advantageous.

The tertiary amines employed can be any tertiary amine, for example, trimethylamine, triethylamine, tripropylamine, diazobicyclooctane (Dabco), methyldiethylamine, dimethylpropylamine, and the like, the tertiary alkyl amines are preferred in the practice of the invention. The tertiary amine should be present in molar excess. The amount of tertiary amine present can range from about 2 to about 50 molar equivalents and preferably about 6 to about 33 molar equivalents per molar equivalent of the alcohol being oxidized. A range of about 10 to about 20 molar equivalents of tertiary amine per molar equivalent of alcohol has been found to be particularly advantageous.

The oxidation reaction is preferably carried out under substantially anhydrous conditions. The oxidation reaction will take place in the presence of a tolerable amount of water but for optimum yields and to keep side reactions at a minimum it is desirable to carry out the oxidation under substantially anhydrous conditions. The presence of water in the reaction mixture generally makes the use of greater amounts of sulfur trioxide or sulfur trioxide complex necessary, thus increasing the cost of the operation. Therefore, the reactants solvent or solvents and the amine are preferably rendered substantially anhydrous, i.e., substantially all water which is not chemically bound is removed before the reagents are brought together. Procedures well known in the art can be used, for example, the liquid hydrocarbon sulfoxide can be dried to a relatively low moisture content by contacting the sulfoxide with a molecular sieve, for example, those which are commercially available as beads or pellets of alkali metal aluminosilicates, for a period of about 1 to 7 days at room temperature. The alcohol to be oxidized if a solid can be dried by conventional methods, for example in a vacuum oven, or if the alcohol is a liquid, it can be dried by simple distillation or by azeotropic distillation with a solvent such as benzene, toluene and the like or it can be dried over a drying agent such as alumina. The tertiary amines can likewise be dried by simple or azeotropic distillation or over drying agents such as potassium hydroxide, calcium hydride, alumina and the like. The sulfur trioxide complexes are normally dry as purchased or as obtained by the method of Everett E. Gilbert supra. If necessary, however, they can be dried by conventional methods for example, under vacuum, preferably at relatively low temperatures.

In the preferred procedure for carrying out the process of this invention, the alcohol starting material is dissolved in dimethylsulfoxide or mixture of dimethyl sulfoxide and an inert solvent or solvents followed by addition of a tertiary amine. A sulfur trioxide complex in dimethylsulfoxide is then added slowly to the reaction media at such a rate as to maintain the desired temperature for carrying out the oxidation reaction.

The novel oxidation process of this invention can be carried out at temperatures within the range of about 0° C. to about 100° C., preferably within the range of from about 20° C. to about 30° C. (about room temperature). After all of the reactants have been brought together the period of time required for substantial completion of the oxidation varies from several minutes to several hours, depending for the most part on the nature of the alcohol being oxidized. The reaction, however, is generally substantially complete in from about 5 to about 30 minutes at the preferred temperature range. Higher or lower temperatures coupled with shorter or longer reaction times can be used if and when desired.

Variations in the order of addition of reactants, amounts thereof and temperatures differing from those given hereinabove are well within the scope of this invention.

The following examples are intended to illustrate the process of this invention as applied to representative primary and secondary alcohols. The following examples are for the purpose of illustrating the best mode contemplated for carrying out the invention and to supplement the foregoing disclosure of the invention with additional descriptions of the manner and process of carrying out the invention so as futher to enable workers skilled in the art to do so. All of the following examples are carried out under substantially anhydrous conditions unless otherwise indicated.

EXAMPLE 1

*Oxidation of 11β,17α,20α,21-tetrahydroxy-4-pregnen-3-one 21-acetate*

To a solution of 0.813 g. (2 millimoles) of 11β,17α,20α, 21-tetrahydroxy - 4 - pregnene-3-one 21-acetate in 10 ml. of dimethylsulfoxide and 0.5 ml. of triethylamine, there was added sulfur trioxide in minute installments until thin-layer chromotography (hereinafter referred to as TLC) indicated virtual absence of starting material. Each addition of sulfur trioxide was followed by the addition of triethylamine in order to maintain the reaction mixture at about pH 8. When the reaction was substantially complete TLC showed an 80–90% conversion of starting material to hydrocortisone acetate.

EXAMPLE 2

*Oxidation of 11β,17α,20α,21-tetrahydroxy-4-pregnen-3-one 21-acetate*

To 1.62 g. (4 millimoles) of 11β,17α,20α,21-tetrahydroxy-4-pregnen-3-one 21-acetate in 8 ml. of dimethylsulfoxide was added 0.8 ml. (6 millimoles) of triethylamine; the solution thus obtained was cooled with stirring in an ice-water bath under a nitrogen atmosphere and 0.7 g. (4.4 millimoles) of pyridine-sulfur trioxide complex was added as a solid. The cooling bath was removed and the reaction mixture was then allowed to stir at room temperature. The progress of the reaction was followed on TLC; a sample withdrawn after 30 minutes showed a heavy spot corresponding to hydrocortisone acetate and only a trace of starting material. Stirring for an additional 5 hours did not produce any change in the TLC analysis.

The reaction mixture was then poured into 80 ml. of ice-water. The precipitate thus obtained was collected on a filter, washed with 5 ml. of dilute hydrochloric acid, 5 ml. of 5% aqueous sodium bicarbonate solution and water to neutral pH and dried at 80° C. under vacuum to give 0.9 g. of crude hydrocortisone acetate. Quantitative preparative TLC analysis showed the product thus obtained to be 77% hydrocortisone acetate; Nuclear Magnetic Resonance analysis (hereinafter NMR) confirmed the structure.

EXAMPLE 3

*Oxidation of 11β,17α,20α,21-tetrahydroxy-4-pregnen-3-one 21-acetate*

A solution of 1.62 g. (4 millimoles) of 11β,17α,20α,21-tetrahydroxy-4-pregnen-3-one 21-acetate in 10 ml. of dimethylsulfoxide and 9 ml. (66 millimoles) of triethylamine was stirred and treated dropwise with a solution of 2.1 g. (13.2 millimoles) of pyridine-sulfur trioxide complex in 10 ml. of dimethylsulfoxide over a period of 6 minutes, while maintaining the temperature at about 20° C. The solution was then allowed to stir at room temperature and the reaction was followed by TLC; the first sample withdrawn 5 minutes after the pyridine-sulfur trioxide addition was complete showed that 90–95% of the starting material had been converted to hydrocortisone acetate; a sample withdrawn after 30 minutes showed only a trace of unreacted starting material remaining in the reaction mixture. Stirring for an additional period of 4 hours did not change the TLC analysis. The reaction mixture was then cooled, adjusted to pH 4.5 with 18% aqueous hydrochloric acid solution and poured slowly into 200 ml. of cold deionized water with vigorous agitation. The crystalline slurry, thus obtained, was extracted with five 40 ml. portions of tetrahydrofuran:chloroform (2:3). The extracts were combined, washed with water and the solvents removed under vacuum. The residue thus obtained was recrystallized from acetone to give 1.43 g. (yield 88.3% w./w., 87.7% theory) of hydrocortisone acetate, M.P. 217.5–221.5 (uncorr.) $[\alpha]_D + 162$ (1% in dioxane);

$\lambda_{max.}$ 242 mμ, $E_{1cm.}^{1\%} = 395$ (0.001% in ethahol)

Quantitative TLC analysis showed the product to be 99% hydrocortisone acetate.

EXAMPLE 4

*Oxidation of 11β,17α,20α,21-tetrahydroxy-4-pregnen-3-one 21-acetate*

A solution of 1.62 g. (4 millimoles) of 11β,17α,20α,21-tetrahydroxy-4-pregnen-3-one 21-acetate in 10 ml. of dimethylsulfoxide, 10 ml. of benzene and 9 ml. (66 millimoles) of triethylamine was cooled to 5° C. and treated dropwise with a solution of 2.1 g. (13.2 millimoles) of pyridine-sulfur trioxide complex in 10 ml. of dimethyl sulfoxide with vigorous stirring while maintaining the temperature at about 5° C. The reaction mixture was then allowed to stir at 5° C. for a period of about 90 minutes. During this period, samples for TLC analysis were withdrawn every five minutes for the first 45 minutes and thereafter every 15 minutes for the next 45 minutes. The sample withdrawn at the end of 90 minutes showed that a significant amount of unreacted starting material remained. The cooling bath was then removed and reaction allowed to proceed at room temperature for an additional period of about one hour. The reaction mixture was then cooled, adjusted to pH 4.5 with 18% aqueous hydrochloric acid solution, poured slowly into 200 mls. of cold deionized water with vigorous agitation and extracted with five 40 ml. portions of tetrahydrofuran:chloroform (2:3). The combined tetrahydrofuran:chloroform extracts were washed with 25 ml. of water, two 25 ml. portions of 5% aqueous hydrochloric acid, 25 ml. of water, 20 ml. of 5% sodium bicarbonate solution and then with several portions of water to neutral pH. The organic solvents were then evaporated off under vacuum and the residue thus obtained was recrystallized from acetone in the presence of activated charcoal to give 1.4 gm. (yield 86.5% w./w.; 86% theory) of hydrocortisone acetate, M.P. 217.5–219.5° C. (uncorr.); $[\alpha]_D + 163°$ (1% in dioxane);

$\lambda_{max}$ 242 m$\mu$, E $^{1\%}_{1cm.}$=392 (0.001% in ethanol)

Quantitative TLC analysis showed the product to be 96–98% hydrocortisone acetate.

EXAMPLE 5

*Oxidation of 11β,17α,20β,21-tetrahydroxy-4-pregnen-3-one 21 acetate*

To a slurry of 1.62 g. (4 millimoles) of 11β,17α,20β,-21-tetrahydroxy-4-pregnen-3-one 21 acetate in 18.3 ml. (13.2 millimoles) of triethylamine was added a solution of 2.1 g. (13.2 millimoles) of pyridine-sulfur trioxide complex in 8.4 ml. of dimethylsulfoxide over a period of 2 minutes with vigorous mixing. Samples for TLC analysis were withdrawn every five minutes for the first 30 minutes and then every half hour over the next four hours. TLC analysis showed that virtually 98–99% of the starting material had reacted during the first five minutes. At the end of the four hour stirring period, the product was recovered from the reaction mixture in the manner described in Example 4, giving 1.31 g. of hydrocortisone acetate (yield 80.8% w./w., 80.4% theory), M.P. 216–220° C.; [α]$_D$+164° (1% in dioxan);

$\lambda_{max}$ 242 m$\mu$, E $^{1\%}_{1cm.}$=387 (0.001% in ethanol)

EXAMPLE 6

*Oxidation of 11β,17α,20α,21-tetrahydroxy-4-pregnen-3-one 21-acetate*

A slurry of 8.1 g. (20 millimoles) of 11β,17α,20α,21-tetrahydroxy-4-pregnen-3-one 21 acetate in 25 ml. tetrahydrofuran and 16.5 ml. (120 millimoles) of triethylamine was stirred and treated dropwise with a solution of 9.5 g. (60 millimoles) of pyridine-sulfur trioxide complex in 38 ml. dimethylsulfoxide, while maintaining the temperature at about 30° C. The first TLC sample withdrawn five minutes after the addition was complete indicated virtual absence of starting material. During the time the TLC analysis was being carried out, the reaction mixture allowed to stir at room temperature. The reaction mixture was then adjusted to 4.5 with 18% aqueous hydrochloric acid and added slowly to 500 ml. of ice-water with vigorous mixing. The precipitate thus obtained was collected on a filter, washed with water to neutral pH and dried under vacuum. The product thus obtained was recrystallized from acetone to give 6.94 g. of hydrocortisone acetate (yield 85.6% w./w.; 85.2% theory); M.P. 213–217° C. (uncorr.); [α]$_D$+163° (1% in dioxan);

$\lambda_{max}$ 242 m$\mu$, E $^{1\%}_{1cm.}$=410 (0.001% in ethanol)

EXAMPLE 7

*Oxidation of 20β-hydroxy-4-pregnen-3-one*

To 0.95 g. (3 millimoles) of 20β-hydroxy-4-pregnen-3-one in 7 ml. dimethylsulfoxide and 7.2 ml. (49.5 millimoles) of triethylamine was added in dropwise fashion a solution of 1.58 g. (9.9 millimoles) of pyridine-sulfur trioxide complex in 8 ml. of dimethylsulfoxide over 9 minutes. The reaction mixture was then allowed to stir at room temperature and the reaction was followed by TLC analysis. About 80% of the starting material reacted during the first five minutes following the addition of the pyridine-sulfur trioxide. The remaining starting material oxidized over the next one hour period. The reaction mixture was then adjusted to pH 4.5 with 18% aqueous hydrochloric acid and poured into 200 ml. of ice-water in the manner described in Example 6, above, to give 0.82 g. (yield 85.2% w./w.) of progesterone, which by quantitative TLC analysed for 90–91% w./w. content of progesterone; a preparative TLC sample showed IR and NMR spectra which were superimposable with those of an authentic sample of progesterone.

EXAMPLE 8

*Oxidation of 11β,21-dihydroxy-4,17-pregnadien-3-one*

A mixture of 33 g. (0.1 mole) of 11β,21-dihydroxy-4,17-pregnadien-3-one, 250 ml. of dimethylsulfoxide, and 238 ml. (1.65 mole) of triethylamine was stirred and treated with a solution of 52.5 g. (0.33 mole) of pyridine-sulfur trioxide complex in 250 ml. of dimethylsulfoxide while maintaining the temperature at about 28–30° C. The reaction mixture was allowed to stir at room temperature for an additional period of about 20 minutes. The reaction mixture was then cooled, adjusted to pH 4.5 with dilute aqueous hydrochloric acid solution and poured slowly into 5 l. of cold deionized water with vigorous agitation. The crystalline slurry, thus obtained, was collected on a filter washed with cold water and dried giving 11β-hydroxy-4,17-pregnadien-3-on-21-al, which was recrystallized from acetone to give 21.43 g. (yield 68.7% w./w.; 68.2% theory) of 11β-hydroxy-4,17-pregnadien-3-on-21-al, M.P. 174–179° C. (uncorr.); a mixed melting point determination of the product thus obtained with an authentic specimen of the same compound did not show any depression; UV, IR and NMR spectra confirmed the structure.

Further concentration of the acetone mother liquors gave a second crop of 11β-hydroxy-4,17-pregnadien-3-on-21-al, 3.1 g., M.P. 174–179° C., thus raising the overall yield to 78.7% w./w. or 78.1% of theory.

EXAMPLE 9

*Oxidation of 16-dehydropregnenolone*

A slurry of 15.75 g. (0.05 mole) of 16-dehydropregnenolone in 125 ml. of dimethylsulfoxide, 115 ml. (0.825 mole) of triethylamine was stirred and treated with a solution of 26.25 g. (0.1665 mole) of pyridine-sulfur trioxide complex in 1225 ml. of dimethylsulfoxide while maintaining the temperature at about 30° C. The reaction mixture was then allowed to stir at room temperature for an additional period of about 30 minutes. The reaction mixture was then cooled, adjusted to pH 4.5 with dilute aqueous hydrochloric acid solution and poured slowly into 2.5 l. of cold deionized water with vigorous agitation. The crystalline slurry, thus obtained, was collected on a filter washed with cold water and dried. The product thus obtained was dissolved in 250 ml. of methylene chloride, treated with 0.72 g. of p-toluenesulfonic acid and stirred at room temperature for about 2 hours. The solution was then washed with 20 ml. of 5% sodium bicarbonate solution followed by two 20 ml. portions of water to neutral pH and the solvent removed under vacuum. The residue thus obtained was chromatographed on alumina and eluted with chloroform:benzene (1:1) to give 7.1 g. (45% w./w. yield) of 16-dehydroprogesterone, M.P. 186–189° C. (uncorr.); a mixed melting point determination with an authentic sample of 16-dehydroprogesterone showed no depressions; IR and NMR spectra confirmed the structure.

EXAMPLE 10

*Oxidation of ergosterol*

A solution of 3.97 g. (0.01 mole) of ergosterol in 25 ml. of tetrahydrofuran, 25 ml. of dimethylsulfoxide and 23 ml. (0.165 mole) of triethylamine was stirred and treated dropwise with a solution of 5.25 g. (0.033 mole) of pyridine-sulfur trioxide complex in 25 ml. of dimethyl sulfoxide, while maintaining the temperature at about 20° C. The solution was then allowed to stir at room temperature for an additional period of about 30 minutes. TLC analysis of the reaction mixture showed about 50% conversion to ergosta-4,7,22-trien-3-one.

EXAMPLE 11

*Oxidation of 17α,20-epoxy-11β,21-dihydroxy-4-pregnen-3-one*

The procedure of Example 10 was carried out using 4 mmoles of 17α,20-epoxy-11β,21-dihydroxy-4-pregnene-3-one in place of ergosterol. TLC and NMR analysis of the reaction mixture showed conversion to 17β,20-epoxy-11β-hydroxy-4-pregnen-3-one-21-al.

EXAMPLE 12

*Oxidation of hydrocortisone*

The procedure of Example 10 was carried out using 4 millimoles of hydrocortisone in place of ergosterol. TLC and NMR analysis of the reaction mixture showed conversion to 11β,17α-dihydroxy-4-pregnene-3,20-dion-21-al.

EXAMPLE 13

*Oxidation of 19-hydroxy-4-sitosten-3-one*

The procedure of Example 10 was carried out using 4 millimoles of 19-hydroxy-4-sitosten-3-one in place of ergosterol. TLC and NMR analysis of the reaction mixture showed conversion to 4-sitosten-3-one-19-al.

EXAMPLE 14

*Oxidation of 11β,17α,20α,21-tetrahydroxy-4-pregnen-3-one*

The procedure of Example 10 was carried out using 4 millimoles of 11β,17α,20α,21-tetrahydroxy-4-pregnen-3-one in place of ergosterol. TLC and NMR analysis of the reaction mixture showed conversion to a mixture comprising hydrocortisone and 11β,17α-dihydroxy-4-pregnen-3,20-dion-21-al.

EXAMPLE 15

*Oxidation of 16α,17α-epoxypregnenolone*

The procedure of Example 10 was carried out using 4 millimoles of 16α,17α-epoxypregnenolone in place of ergosterol. TLC and NMR analysis of the reaction mixture showed conversion to 16α,17α-epoxyprogesterone.

EXAMPLE 16

*Oxidation of perillylalcohol*

The procedure of Example 10 was carried out using 4 millimoles of perillylalcohol in place of ergosterol. TLC analysis of the reaction mixture showed a high yield of perillyaldehyde.

EXAMPLE 17

*Oxidation of testosterone*

A mixture of 2.88 g. (10 millimoles) of testosterone, 10 ml. of dimethylsulfoxide, and 9 ml. (66 millimoles) of triethylamine was stirred and treated with 4.78 g. (30 millimoles) of pyridine-sulfur trioxide complex in 20 ml. of dimethylsulfoxide while maintaining the temperature at about 20° C. TLC analysis showed the oxidation to be almost instantaneous. The reaction mixture was then cooled, adjusted to pH 4.5 with 18% aqueous hydrochloric acid solution and poured slowly into 200 ml. of cold deionized water with vigorous agitation. The crystalline slurry, thus obtained, was collected on a filter washed with cold water to neutral pH and dried giving 2.82 g. of 4-androstene-3,17-dione, which by quantitative TLC analyzed for 98% 4-androsten-3,17-dione; its NMR spectrum was identical to that of an authentic sample of 4-androstene-3,17-dione.

The procedure of Example 17 was repeated using an equivalent amount of tetramethylenesulfoxide in place of dimethylsulfoxide to give 4-androstene-3,17-dione.

EXAMPLE 18

*Oxidation of testosterone*

Following the procedure of Example 17, above, 1.44 g. (5 millimoles) of testosterone in 5 ml. of dimethylsulfoxide and 4.5 ml. (33 millimoles) of triethylamine was oxidized in the presence of 0.2 ml. (11 millimoles) of water with 2.39 g. (15 millimoles) of pyridine-sulfur trioxide complex. TLC analysis showed that approximately 75% of the testosterone was converted to 4-androstene-3,17-dione.

EXAMPLE 19

*Oxidation of epitestosterone*

To 0.288 gm. (1 millimole) of epitestosterone in 0.9 ml. (6.6 millimoles) of triethylamine was added a solution of 0.478 gm. (3 millimoles) pyridine sulfur trioxide complex in 3 mls. dimethylsulfoxide. The solution thus obtained was allowed to stir at room temperature and the reaction followed on TLC. The TLC analysis showed that about 90–95% of the starting epitestosterone oxidized to 4-androstene-3,17-dione during the first five minutes, the remaining epitestosterone oxidized slowly to 4-androstene-3,17-dione over the next thirty minutes.

EXAMPLE 20

*Oxidation of 11α-hydroxyprogesterone*

A mixture of 3.3 gms. (10 millimoles) of 11α-hydroxyprogesterone, 12 mls. of dimethylsulfoxide and 8.25 mls. of triethylamine (60 millimoles) was oxidized with 4.75 gms. (30 millimoles) of pyridine-sulfur trioxide complex in 19 mls. of dimethylsulfoxide. The reaction was followed on TLC and the product was isolated from the reaction mixture in the same manner as described in Example 17, above, to give 3.09 gms. of crude product which by quantitative TLC analyzed for 72–73% 11-ketoprogesterone; NMR spectrum of the isolated material was identical with that of an authentic specimen of 11-ketoprogesterone.

EXAMPLE 21

*Oxidation of β-cholestanol*

β-cholestanol [3.88 gms. (10 millimoles)] was oxidized to cholestanone employing the same reaction conditions as in Example 20, above, and isolated from the reaction mixture in the manner described in Example 17, to give 3.2 gms. of 5α-cholestanone M.P. 127.5–129° C. (uncorr.); a mixed M.P. of the 5α-cholestanone thus obtained with an authentic specimen of 5α-cholestanone showed no depression and the NMR spectrum was identical to that of the authentic specimen of 5α-cholestanone.

EXAMPLE 22

*Oxidation of l-menthol* l-menthol [1.56 gms. (10 millimoles)] was oxidized to l-menthone employing the same reaction conditions as in Example 20, above. The reaction mixture was cooled, adjusted to pH 4.5 with hydrochloric acid and poured into 200 ml. of water in the manner described in Example 17, above, and extracted with chloroform. The chloroform extract was washed with water and the solvent removed under reduced pressure to give l-menthone as an oil which was converted to its 2,4-dinitrophenylhydrozone derivative, M.P. 113–116° C.; recrystallization from ethanol raised the M.P. to 146–147.5° C.

EXAMPLE 23

*Oxidation of p-nitrobenzyl alcohol* p-Nitrobenzyl alcohol [1.53 gms. (10 millimoles)] was oxidized to p-nitrobenzaldehyde employing the same reaction conditions as described in Example 20, above. The product thus obtained was isolated from the reaction mixture in the manner described in Example 17, above, to give 1.22 gms. of p-nitrobenzaldehyde, M.P. 102–104° C.;

a single recrystallization from water raised the M.P. to 105–106.5° C. A mixed melting point determination of the recrystallized p-nitrobenzaldehyde thus obtained with an authentic specimen of p-nitrobenzaldehyde showed no depression and the NMR spectrum of the recrystallized p-nitrobenzaldehyde was identical with that of the authentic specimen.

In the same manner following the procedure of Example 23, but substituting other alcohols as starting material in place of p-nitrobenzyl alcohol, for example: 1-propanol, 2-butanol, 3-pentanol, 1-N-octanol, cyclohexanol, cycloheptanol and cyclododecanol, there is respectively obtained the corresponding aldehyde or ketone, namely propionaldehyde, methyl ethyl ketone, diethylketone, octanal-1, cyclohexanone, cycloheptanone and cyclododecanone.

EXAMPLE 24

*Oxygenation of cyclododecane-1,6-diol*

A solution of 2-millimole of cyclododecane-1,6-diol in 5 ml. of diethylsulfoxide and 12 millimoles of dimethylpropylamine is stirred and treated with 6-millimoles trimethylamine-sulfur trioxide complex in 5 ml. of diethylsulfoxide keeping the temperature at about 25° C. The reaction mixture is then stirred for an additional period of about 30 minutes, cooled to about 0° C. adjusted to pH 4.5 with diluted hydrochloric acid, diluted with about 100 ml. of cold water and extracted with three 50 ml. portions of methylene chloride. The methylene chloride extracts are combined, washed with water, dried over anhydrous sodium sulfate and the solvent removed under reduced pressure to obtain cyclododecane-1,6-dione as a crystalline solid which can be further purified by recrystallization from acetone-skellysolve B hexanes.

EXAMPLE 25

*Oxidation of 4,4'-dihydroxybicyclohexyl*

A solution of 2 millimoles of 4,4'-dihydroxybicyclohexyl in 20 ml. of tetramethylene sulfoxide and 40 millimoles of methyl diethyl amine is stirred and treated with 10 millimoles of pyridine-sulfur trioxide complex in 5 ml. of tetramethylene-sulfoxide, while maintaining the temperature between 20 and 30° C. The reaction mixture is then stirred for an additional period of about 30 minutes, cooled to 0° C. adjusted to pH 4.5 with dilute hydrochloric acid, diluted with about 100 ml. of cold water and the product recovered by extraction and recrystallization in the manner disclosed in Example 22, above, to give 4,4'-dioxobicyclohexyl.

EXAMPLE 26

*Oxidation of 3'-O-acetylthymidine*

A solution of 1 millimole of 3'-O-acetylthymidine in 3 ml. of dimethysulfoxide and 16.5 millimoles of triethylamine was stirred and treated dropwise with a solution of 3.3 millimoles of pyridine sulfur-trioxide complex in about 2.5 ml. of dimethylsulfoxide while maintaining the temperature at about 20° C., stirring is containued for an additional 30 minutes giving a high yield of 3'-O-acetylthymidine-5'-aldehyde which can be recovered from the reaction mixture as its crystalline 2,4-dinitrophenylhydrazone.

EXAMPLE 27

*Oxidation of bicyclo[3.2.1]octan-6-ol*

Following the procedure of Example 26, above, bicyclo[3.2.1.]octan-6-ol is oxidized to bicyclo[3.2.1.]octan-6-one, M.P. 157–158° C.

EXAMPLE 28

*Oxidation of cyclobutanemethanol*

Following the procedure of Example 26, above, cyclobutanemethanol is oxidized to cyclobutanecarboxaldehyde, BP. 116–117° C.

EXAMPLE 29

*Oxidation of 11β,17α,20α,21-tetra-1,4-pregnadien-3-one 21-acetate*

Following the procedure of Examples 1–6, above, but substituting 11β,17α,20α,21-tetrahydroxy-1,4-pregnadiene-3-one 21-acetate in place of 11β,17α,20α or 20β-tetrahydroxy-4-pregnen-3-one 21-acetate, gives prednisolone acetate.

In the same manner the corresponding 20β-compound and the 20α and/or 20β-hydroxy groups of other steroids can likewise be selectively oxidized to keto, for example:

11β,17α,20β,21-tetrahydroxy-1,4-pregnadien-3-one 21-acetate to prednisolone acetate;

5α,11β,17α,20α,21 - pentahydroxy - 6β-methylpregnan-3-one 21-acetate to 5α,11β,17α,21-tetrahydroxy-6β-methylpregnane-3,20 dione 21-acetate;

5α,11β,17α,20β,21 - pentahydroxy - 6β-methylpregnan-3-one 21-acetate to 5α,11β,17α,21-tetrahydroxy-6β-methylpregnane-3,20 dione 21-acetate;

and the like.

We claim:

1. A process for the oxidation of primary and secondary alcohols, to the corresponding aldehydes and ketones, which comprises reacting a primary or secondary alcohol with a liquid hydrocarbon sulfoxide and sulfur trioxide in the presence of a tertiary amine.

2. A process according to claim 1, wherein the reaction is carried out under substantially anhydrous conditions.

3. A process according to claim 1, wherein a primary alcohol is oxidized to an aldehyde.

4. A process according to claim 1, wherein a secondary alcohol is oxidized to a ketone.

5. A process according to claim 1, wherein a stearoidal primary alcohol is oxidized to a steroidal aldehyde.

6. A process according to claim 1, wherein a steroidal secondary alcohol is oxidized to a steroidal ketone.

7. A process according to claim 1, wherein an allylic primary alcohol is oxidized to an α,β-unsaturated aldehyde.

8. A process according to claim 1, wherein an allylic secondary alcohol is oxidized to an α,β-unsaturated ketone.

9. A process according to claim 1, wherein the sulfur trioxide employed is in the form of a sulfur trioxide complex.

10. A process according to claim 1, wherein the sulfur trioxide employed is pyridine-sulfur trioxide complex.

11. A process according to claim 1, wherein the liquid hydrocarbon sulfoxide is dimethylsulfoxide.

12. A process according to claim 1, wherein the tertiary amine is a tertiary alkyl amine.

13. A process according to claim 1, wherein the tertiary amine is triethylamine.

14. A process for the selective oxidation of a 20-hydroxy group in a steroid containing a sterically hindered 11β-hydroxy group to obtain the corresponding 11β-hydroxy-20-keto steroid, which comprises reacting an 11β,20-dihydroxy steroid under substantially anhydrous conditions with a liquid hydrocarbon sulfoxide and sulfur trioxide in the presence of a tertiary amine.

15. A process according to claim 14, wherein the sulfur trioxide employed is in the form of a sulfur trioxide complex.

16. A process according to claim 14, wherein the sulfur trioxide employed is pyridine-sulfur trioxide complex.

17. A process according to claim 14, wherein the liquid hydrocarbon sulfoxide is dimethylsulfoxide.

18. A process according to claim 14, wherein the tertiary amine is a tertiary alkyl amine.

19. A process according to claim 14, wherein the tertiary amine is triethylamine.

20. A process according to claim 14, wherein 11β,17α,20α,21-tetrahydroxy - 4 - pregnen-3-one 21-acetate is oxidized to hydrocortisone acetate.

21. A process according to claim 14, wherein 11β,17α,20β,21-tetrahydroxy - 4 - pregnen-3-one 21-acetate is oxidized to hydrocortisone acetate.

22. A process according to claim 14, wherein 11β,17α,20α,21-tetrahydroxy - 1,4 - pregnadien-3-one 21-acetate is oxidized to prednisolone acetate.

23. A process according to claim 14, wherein 11β,17α,20β,21-tetrahydroxy - 1,4 - pregnadien-3-one 21-acetate is oxidized to prednisolene acetate.

24. A process according to claim 14, wherein 5α,11β,17α,20α,21-pentahydroxy - 6β - methylpregnan-3-one 21-acetate is oxidized to 5α,11β,17α,21 - tetrahydroxy-6β-methylpregnane-3,20-dione 21-acetate.

25. A process according to claim 14, wherein 5α,11β,17α,20β,21-pentahydroxy - 6β - methylpregnan-3-one 21-acetate is oxidized to 5α,11β,17α,21 - tetrahydroxy-6β-methylpregnane-3,20-dione 21-acetate.

26. A process for the selective oxidation of 11β,17α,20α,21-tetrahydroxy - 4 - pregnen-3-one 21-acetate to hydrocortisone acetate, which comprises reacting 11β,17α,20α,21-tetrahydroxy - 4 - pregnen-3-one 21-acetate under substantially anhydrous conditions with dimethylsulfoxide and pyridine-sulfur trioxide complex in the presence of triethylamine.

27. A process for the selective oxidation of 11β,17α,20β,21-tetrahydroxy - 4 - pregnen-3-one 21-acetate to hydrocortisone acetate, which comprises reacting 11β,17α,20β,21-tetrahydroxy - 4 - pregnen-3-one 21-acetate under substantially anhydrous conditions with dimethylsulfoxide and pyridine-sulfur trioxide complex in the presence of triethylamine.

References Cited
UNITED STATES PATENTS 3,364,219  1/1968  Albright et al. _____ 260—285

LEWIS GOTTS, *Primary Examiner.*

D. RIVERS, *Assistant Examiner.*

U.S. Cl. X.R.

260—211.5, 239, 239.55, 283, 284, 287, 294.7, 297, 326.5, 326.16, 332.3, 347.8, 397.2, 397.3, 586, 587, 590, 596, 598, 599, 603, 687